United States Patent [19]

Hohl et al.

[11] 4,165,792
[45] Aug. 28, 1979

[54] LOAD BOOSTER WHEEL ASSEMBLY

[75] Inventors: William A. Hohl, Charleston Heights; Herbert L. Orwig, Summerville, both of S.C.

[73] Assignee: A-T-O Inc., Willoughby, Ohio

[21] Appl. No.: 867,977

[22] Filed: Jan. 9, 1978

[51] Int. Cl.² ............................................. B60G 21/00
[52] U.S. Cl. .............................. 180/24.02; 280/112 R
[58] Field of Search .................. 280/112 R; 180/24.02

[56] References Cited

U.S. PATENT DOCUMENTS

| | | | |
|---|---|---|---|
| 2,599,043 | 6/1952 | Bissell | 180/24.02 |
| 3,197,237 | 7/1965 | Smith | 180/24.02 |
| 3,617,072 | 11/1971 | Turner, Jr. | 180/24.02 |
| 3,713,663 | 1/1973 | Granning | 280/112 R |
| 4,053,170 | 10/1977 | Hyler et al. | 280/112 R |

Primary Examiner—Richard A. Bertsch

[57] ABSTRACT

The rear end of the truck frame carries a load boosting wheel assembly. The wheels are mounted on a transverse axle which is supported by a forwardly extending wishbone, the front of which has a ball and socket connection to a depending support bracket. The rear portion of the wishbone is guided for vertical movement between the load carrying position and an elevated position. The wheels are actuated to the downward position by air pressure inside the air bag assembly mounted between the wishbone and the frame. The midsection of the air bag assembly is provided with a rigid annulus which is contained to linear motion.

11 Claims, 6 Drawing Figures

U.S. Patent    Aug. 28, 1979    4,165,792
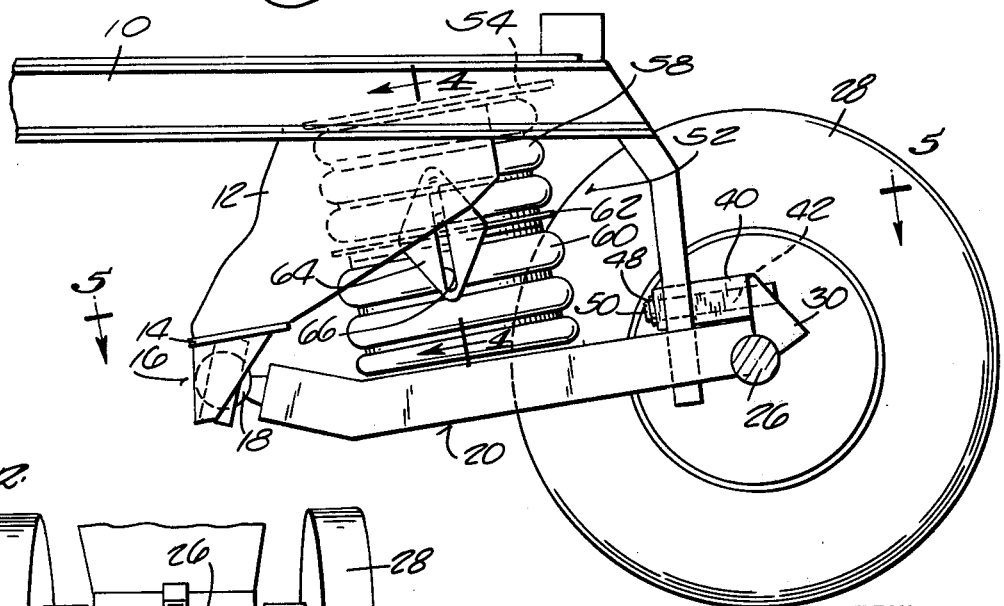
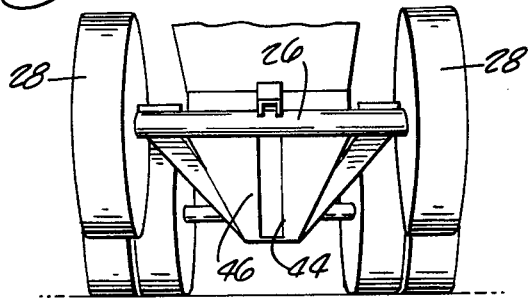
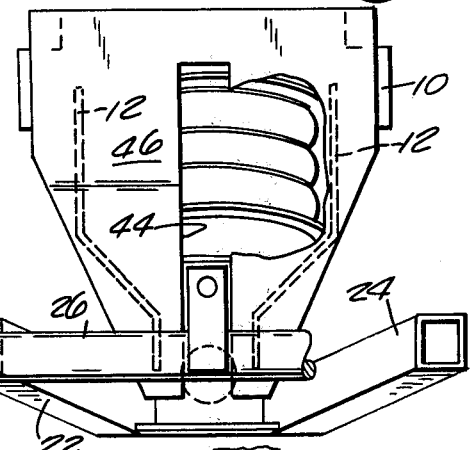
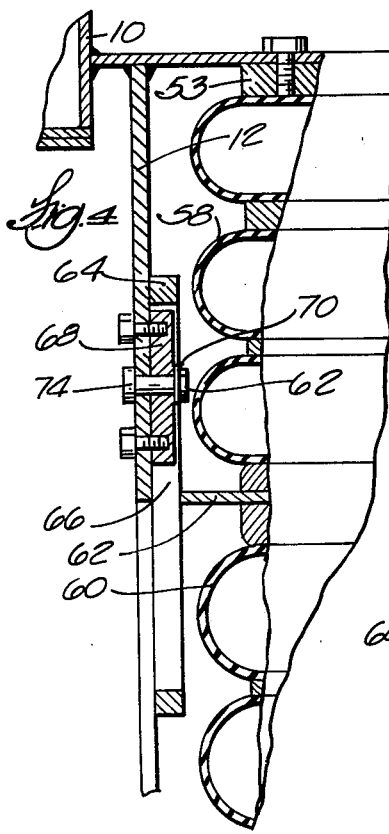
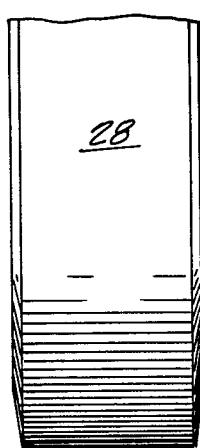
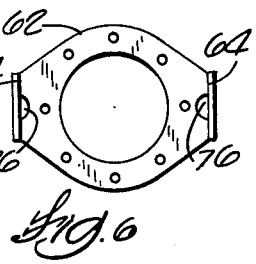
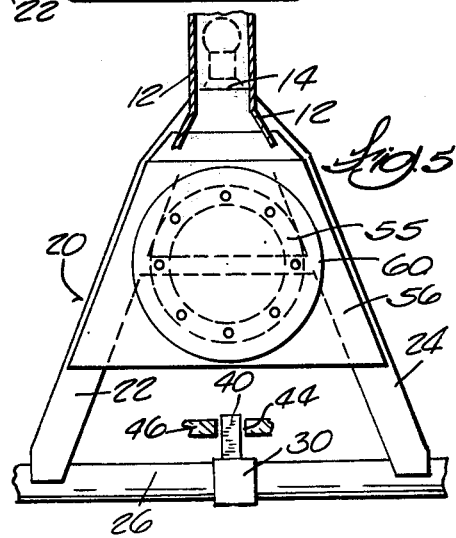

LOAD BOOSTER WHEEL ASSEMBLY

BACKGROUND OF THE INVENTION

With various vehicles operated on and off the highway, there is a problem in meeting weight restrictions for highway use. These problems have been overcome by use of what is termed a load booster wheel assembly which is simply an auxiliary set of wheels which can be loaded when the vehicle is operated on the highway so as to take up part of the load and bring the loading on each axle into legal restrictions. When the vehicle is to be operated off the highway, generally these load booster wheels are desirably taken out of operating position to minimize the risk of damage to the wheel assemblies and to increase the mobility of the vehicle.

The prior art approach is that the load booster wheels have frequently been carried by a wheel support assembly actuated to its operating position by an air bag positioned near each end of the axle. These arrangements have a failing in that when the wheel assembly is hoisted vertically to its inoperative position there is not enough clearance between the hoisted wheels and the ground or ground structure to achieve maximum mobility for positioning the truck and to prevent or minimize risk of damage to the booster assembly. It is true that the booster assembly is generally carried on an auxiliary frame which can be moved to a desired rearward position for use and brought forwardly to take the wheels closer to the fixed rear axles, but this still does not overcome the problem of lack of mobility and damage to the booster assembly. Up to now there has not been adequate vertical travel of the load booster wheels between the operating and the inoperative positions.

Attention is directed to examples of prior load booster wheel assemblies such as those just described, and which are disclosed in the following U.S. patents:

| | | |
|---|---|---|
| Granning | 3,133,745 | Issued May 19, 1964 |
| Granning | 3,325,181 | Issued June 13, 1967 |
| Granning | 3,689,102 | Issued September 5, 1972 |
| Granning | 3,713,663 | Issued January 30, 1973 |
| Granning | 3,747,948 | Issued July 24, 1973 |

SUMMARY OF THE INVENTION

The primary object of this invention is to provide a greatly increased vertical travel of a load booster wheel assembly between its operative and inoperative position. In carrying out this invention, an air bag assembly having a substantially greater length than normal is necessary to obtain the desired stroke. This then gives rise to inherent problems of instability of a long air bag. To overcome this problem means have been devised for constraining a rigid midsection of the long air bag assembly to linear travel, thus stabilizing the otherwise unstable air bag.

Another object is to provide for the increased stroke of the booster wheels without paying a cost penalty by reason of use of a long stroke air bag. This has been accomplished by employing but a single air bag assembly as opposed to the prior art employing an air bag adjacent each of the booster wheels. In addition, the wishbone is bent upwardly adjacent or forwardly of the ball and socket or pivot support to vertically raise the wheel axle relative to the pivot support. Furthermore, the single air bag is positioned generally at the midpoint between the pivot support for the wishbone and the axles whereby a motion multiplying effect is obtained and travel of the booster wheels is increased.

The bent wishbone is formed so that in its operative or load bearing position the air bag end plate carried by the wishbone will be generally parallel to the opposed end plate carried by and canted with respect to the frame. This minimizes the tendency of the air bag to go out of column.

BRIEF DESCRIPTION OF THE DRAWING

FIG. 1 is a side view shown partially in section of a load booster wheel assembly which embodies various features of the invention.

FIG. 2 is a diagrammatic view of the assembly shown in FIG. 1 with the booster wheels in an elevated position.

FIG. 3 is a partially broken away end view of the assembly shown in FIG. 1.

FIG. 4 is a partial sectional view taken along lines 4—4 shown in FIG. 1.

FIG. 5 is sectional view taken along lines 5—5 shown in FIG. 1.

FIG. 6 is a plan view of an intermediate annular plate located in the midsection of the air bag assembly shown in FIG. 1.

DESCRIPTION OF THE PREFERRED EMBODIMENT

In some instances the truck frame 10 will be the main frame but generally it is an auxiliary frame mounted for fore and aft movement on the main truck frame. As an auxiliary frame, it is moved rearwardly when the load booster is to be used and is moved forwardly when the load booster is taken out of use. The frame is provided with support structure such as spaced depending brackets 12 the lower ends of which are joined by a transverse plate 14 which supports the spherical socket 16 for the ball 18 carried on the forward end of the wheel support frame, preferably in the form of a wishbone assembly 20. The wishbone had diverging rearwardly extending legs 22, 24 supporting at the rear end the transverse axle 26 on which the wheels 28 are supported. The wishbone is bent upwardly adjacent or forwardly of the ball 18 as shown in FIG. 1 to vertically raise the wheel axle 26 relative to the ball 18. A support bracket 30 is secured to the midsection of axle 26 and pivotally supports a square guide block 40 on a forwardly projecting shaft 42 inside the guide slot 44 provided in the plate 46 fixed on the rear of frame 10. The guide block 40 and shaft 42 therefore, constrain the middle section of the axle 26 to vertical movement while permitting the axle to cock about the axis of the shaft. The guideblock is retained on the shaft 42 by a snap ring 48 retained by nut 50.

The load booster wheels are, therefore, movable between the lowermost position shown in FIG. 1 and an elevated or uppermost position diagramatically shown in FIG. 2 with the axle guided by the guide block moving in slot 44. Any conventional means can be used to elevate the wishbone and booster wheels to the inoperative, elevated position. The wheels are actuated to the lower position by applying air pressure to the interior of the air bag assembly 52. The upper end of the air bag, which includes an annular plate 53, (partially shown in FIG. 4) is fixed and sealed to a solid upper plate 54 mounted in frame 10 at an angle as indicated in FIG. 1. The lower end of the air bag 52, which includes an annular plate 55, (see FIG. 5) is connected and sealed to a solid lower plate 56 generally carried at the midpoint of the wishbone 20 as shown in FIG. 5. Thus, inflation of the air bag, which is generally equidistant from the booster wheels, provides a motion multiplying effect to increase the travel of the axle assembly and booster wheels. The wishbone is bent as appears in FIG. 1 to position the end plate 56 generally parallel to the upper end plate 54 when the bag is extended and the booster wheels are in operating position.

The air bag 52 has considerable length as compared to those normally employed in the industry and would generally be regarded as being inherently unstable due to its extraordinary length. Essentially, the bag assembly 52 comprises two of what may be considered standard air bags of maximum length. Each of the confronting faces of the separate air bags 58, 60 terminates in a mounting annulus and these are interconnected through the two annular ends with an intermediate annular plate 62 sandwiched therebetween. The plate, of course, is annular or perforated within the confines of the air bag assembly 52 to make the air bag operate as a single unit.

Means are provided for constraining the annular plate 62, or the rigid mid-section of the airbag assembly, to substantially linear travel. Various constraining means could be utilized. For example, a pair of elongated arms extending on opposite sides of the airbag assembly and pivotally secured at opposite ends to the outer side surfaces of the socket 16 and to the opposite "sides" of the plate 62, could be utilized. Thus, the mid-section of the airbag assembly would be constrained to travel the same path as the outer ends of the arms; i.e., a relatively small arc which is substantially linear over the range of displacement of the plate 62.

In the illustrated and preferred construction the constraining means comprises each of the transverse sides plate 62 being provided with a guide plate 64 welded to plate 62 and provided with an elongated slot 66 parallel to the axis of the bag assembly 52. The adjacent portions of each of the depending brackets 12 is provided with an elongated bearing or shoe 68 which projects into the adjacent slot 66. The shoe 68 is retained within the slot 66 by a washer 70 secured by nut 62 to a shoulder bolt 74 extending through the shoe and slot. The plate 62 is provided with cutouts 76 to allow clearance for the washers and bolts as the shoes travel in the slots 66. This, therefore, constrains the guide plates 64 and, therefore, the midsection of the air bag 52, to linear motion in the fore and aft direction. By reason of the fact that the two brackets 12 straddle the air bag in the transverse sence, it also constrains the bag against going out of column in the transverse sense. Therefore, the midsection of this inordinately long air bag is constrained to linear travel and the bag cannot go out of column with obvious deleterious effects on the function of the bag.

With this long air bag assembly, it is believed the usable motion of the booster wheels has been more than doubled as compared to the prior art. While the air bag assembly and its guide plates are more expensive than a simple air bag assembly of the type employed in the past, only one actuating point is employed as opposed to the duo actuation previously employed in this art and there is no substantial cost penalty for the advantages obtained. In describing the air bag, it will be understood that the bellows portion of the air bags are made of reinforced elastomeric material and such materials normally could go out of column or go out of shape rather readily absent constraints due to a relatively short length and to a small number of bellows (as in the past) or due to the rigid guided reinforcement in the midsection as in the present disclosure.

I claim:

1. A load booster wheel assembly for use in conjunction with trucks comprising
   a frame,
   a support structure depending from the frame in the proximity of the rear of the frame,
   a wheel support frame connected to the depending support structure for pivotal movement relative to the frame, said support frame projecting rearwardly from said support structure,
   an axle supported at the rear end of the support frame and carrying booster wheels,
   means for constraining the central portion of the axle to substantially vertical movement while permitting differential movement of the outboard ends of the axle, said support frame being movable between an operative position in which the wheels are in contact with the terrain and an inoperative position in which the wheels are raised out of engagement with the terrain,
   means for moving the support frame into the operative position comprising
   an air bag assembly mounted between the truck frame and the support frame, said air bag assembly having substantial length and being provided with a rigid midsection, and means for constraining the rigid midsection of the air bag assembly to substantially linear travel.

2. A load booster wheel assembly according to claim 1 wherein the rigid midsection of the air bag assembly is provided with guide means and the depending support structure is provided with cooperating guide means for achieving linear constraint.

3. A load booster wheel assembly according to claim 2
   wherein said support structure comprises spaced support brackets,
   wherein said air bag assembly includes two air bags having confronting annular ends secured together with an annular intermediate plate extending therebetween to provide the rigid midsection,
   said intermediate plate including said guide means which comprises a pair of guide plates respectively secured on opposite sides of said plate and each located adjacent one of the depending support brackets, said guide plates including slots extending generally parallel with the vertical axis of the air bags, and
   wherein said cooperating guide means comprises shoe means extending from said depending support brackets into the adjacent guide plate slots.

4. A load booster wheel assembly according to claim 1 wherein said air bag assembly includes rigid end plates respectively connected to the frame and to the wheel support frame so that the end plates are substantially parallel when the wheel support frame is in an operative position.

5. A load booster wheel assembly according to claim 4
   wherein said air bag assembly includes upper and lower annular plates at the opposite ends thereof,
   wherein one of said rigid end plates comprises said annular lower plate connected and sealed to a solid lower plate carried on and secured at generally the midpoint of said wheel support frame, and wherein the other one of said rigid end plates comprises said annular upper plate connected and sealed to a solid upper plate connected to the frame at an angle so that the rigid end plates are substantially parallel when the wheel support frame is in operative position, said air bag assembly being located generally equidistant from the load booster wheels.

6. A load booster wheel assembly according to claim 1 wherein said wheel support frame is wishbone shaped, having a forward end pivotally connected to said depending support structure and having diverging rearwardly extending legs having said axle connected at the rear ends thereof, said support frame being bent upwardly so that said axle is vertically raised with respect to said forward end.

7. A load booster wheel assembly according to claim 1 wherein said means for constraining the central portion of the axle comprises a plate including a vertical slot fixed to and depending from the rear end of said frame, and a forwardly extending shaft secured to the midsection of said axle assembly and pivotally supporting a guide block received within said vertical slot.

8. A load booster wheel assembly according to claim 1 wherein said support structure includes at the lower end thereof means for defining a spherical socket, and wherein said support frame includes a forward end having a ball rotatably secured within said spherical socket.

9. A load booster wheel assembly for use in conjunction with trucks comprising a frame, an axle carrying booster wheels, spaced support brackets depending from the frame in the proximity of the rear of the frame and including cooperating guide means, a wishbone shaped wheel support frame having a forward end pivotally connected to said depending brackets and having diverging rearwardly extending legs connected at the rear ends thereof to said axle, said support frame being bent upwardly so that said axle is vertically raised with respect to said forward end, means for constraining the central portion of the axle to substantially vertical movement while permitting differential movement of the outboard ends of the axle, said support frame being movable between an operative position in which the wheels are in contact with the terrain and an inoperative position in which the wheels are raised out of engagement with the terrain, means for moving the support frame into an operative position comprising an air bag assembly mounted between the truck frame and the support frame, said air bag assembly having substantial length and being provided with a rigid midsection, said midsection including guide means associated with said support bracket cooperating guide means for constraining the rigid midsection to substantially linear travel, said air bag assembly including rigid end plates respectively mounted to the frame and the wheel support frame so that the end plates are substantially parallel when the wheel support frame is in an operative position, whereby the air bag assembly remains substantially in column when under load.

10. A load booster wheel assembly according to claim 9 wherein said air bag assembly includes two air bags having confronting annular ends secured together with an annular intermediate plate extending therebetween to provide the rigid midsection, said secured air bags having annular upper and lower plates at the opposite ends thereof, wherein one of said air bag assembly rigid end plates comprises said annular lower plate connected and sealed to a solid lower plate carried on and secured at generally the midpoint of said wheel support frame, wherein the other one of said air bag assembly rigid end plates comprises an annular upper plate connected and sealed to a solid upper plate connected to the frame at an angle so that the rigid end plates are substantially parallel when the wheel support frame is in operative position, said air bag assembly being located generally equidistant from the load booster wheels, wherein said intermediate plates includes said guide means which comprises a pair of guide plates respectively secured on opposite sides of said intermediate plate and each located adjacent one of the depending support brackets, said guide plates including slots extending generally parallel with the vertical axis of the air bags, and wherein said cooperating guide means comprises shoe means extending from said depending support brackets into the adjacent guide plate slots.

11. A load booster according to claim 10 wherein said depending support brackets include at the lower ends thereof means for defining a spherical socket, wherein said forward end of said support frame includes a ball rotatably secured within said spherical socket, and wherein said means for constraining the central portion of the axle comprises a plate including a vertical slot and fixed to and depending from the rear end of said frame, and a forwardly extending shaft secured to the midsection of said axle and pivotally supporting a guide block received within said vertical slot.

* * * * *